(12) United States Patent
Abel et al.

(10) Patent No.: US 11,285,869 B2
(45) Date of Patent: Mar. 29, 2022

(54) DECORATIVE PART

(71) Applicant: JOYSONQUIN Automotive Systems GmbH, Rutesheim (DE)

(72) Inventors: Thomas Abel, Ludenscheid (DE); Frank Huhnerbein, Sachsenheim (DE); Ann-Kathrin Diehl, Stuttgart (DE); Steffen Daschner, Kraichtal (DE)

(73) Assignee: Joysonquin Automotive Systems GMBH, Rutesheim (DE)

( * ) Notice: Subject to any disclaimer, the term of this patent is extended or adjusted under 35 U.S.C. 154(b) by 0 days.

(21) Appl. No.: 16/752,951

(22) Filed: Jan. 27, 2020

(65) Prior Publication Data

US 2020/0247314 A1 Aug. 6, 2020

(30) Foreign Application Priority Data

Feb. 1, 2019 (DE) .................... 102019201346.5

(51) Int. Cl.
*B60Q 3/74* (2017.01)
*F21V 7/04* (2006.01)
(Continued)

(52) U.S. Cl.
CPC ............... *B60Q 3/74* (2017.02); *B60Q 3/54* (2017.02); *F21V 7/0091* (2013.01); *F21V 7/04* (2013.01)

(58) Field of Classification Search
CPC .... B60Q 3/14; B60Q 3/54; B60Q 3/74; F21V 7/0091; F21V 7/04
See application file for complete search history.

(56) References Cited

U.S. PATENT DOCUMENTS

| 2009/0129107 A1* | 5/2009 | Egerer | ............... B60Q 3/64 |
| | | | 362/509 |
| 2017/0066373 A1* | 3/2017 | LeCompte | ............... B60Q 3/76 |
| (Continued) | | | |

FOREIGN PATENT DOCUMENTS

| CN | 102774318 | 11/2012 |
| DE | 8816551 U1 | 11/1989 |
| (Continued) | | |

OTHER PUBLICATIONS

Search Report from corresponding German Application No. 10 2019 201 346.5 dated Jan. 10, 2019; 8 pages.

(Continued)

*Primary Examiner* — Rajarshi Chakraborty
*Assistant Examiner* — Nathaniel J Lee
(74) *Attorney, Agent, or Firm* — Fattibene and Fattibene LLC; Paul A. Fattibene

(57) ABSTRACT

A decorative part, in particular for a vehicle interior, having a decorative layer with a visible front surface, a support on a reverse side of the decorative layer and a light-conducting layer provided between the support and the decorative layer for backlighting at least part of the decorative layer, which is assigned a light-conducting element for generating light. For more uniform backlighting of the decorative layer, a light-conducting dome is provided on a reverse side of the light-conducting layer facing away from the decorative layer, which protrudes therefrom and is coupled in a light-conducting manner to the light-conducting layer and at its free end to the light element.

17 Claims, 5 Drawing Sheets

(51) Int. Cl.
  *F21V 7/00*   (2006.01)
  *B60Q 3/54*   (2017.01)

(56) References Cited

U.S. PATENT DOCUMENTS

2017/0158119 A1*  6/2017  Weih ........................ B60Q 3/14
2017/0268740 A1*  9/2017  Boenigk ............... F21S 41/143
2019/0001878 A1*  1/2019  Schneider ........ B29D 11/00317
2019/0176692 A1   6/2019  Betz et al. ............... B60Q 3/66
2019/0346612 A1* 11/2019  Herlin .................. G02B 6/0038

FOREIGN PATENT DOCUMENTS

| DE | 10 2014 100 042 | 7/2015 |
| DE | 102015105974 | 10/2016 |
| DE | 202015106328 U1 | 12/2016 |
| DE | 102016009660 | 2/2018 |
| DE | 202017105880 U1 | 11/2018 |

OTHER PUBLICATIONS

Office Action dated Jul. 30, 2021 in the counterpart Chinese application No. 202010078720.5, with English translation, 13 pages.

\* cited by examiner

DECORATIVE PART

FIELD OF THE INVENTION

The present invention relates to a decorative part, in particular a decorative part for a vehicle interior. The decorative part according to the invention has a decorative layer with a visible front surface, a support provided on the reverse side of the decorative layer and a light-conducting layer for backlighting at least part of the decorative layer. The light conducting layer is arranged between the support and the decorative layer. A light element for generating light is assigned to it.

BACKGROUND OF THE INVENTION

Such a decorative part is known, for example, from DE10 2014 100 042 A1 or DE20 2015 106 328 U1. In these previously known decorative parts, the light element is located on the reverse side of the light-conducting layer facing away from the decorative layer and distributes the light produced by the light element in its plane extension. A top view of the decorative part, however, results in a relatively higher light emission directly in the area of the light element compared with those areas which are relatively far from the light element. This accordingly results in inhomogeneous light distribution within the light-conducting layer so that the decorative layer is not uniformly backlit. This means that the desired optical and aesthetic impression which is to be conveyed by the decorative part cannot always be achieved.

From DE 20 2017 105 880 U1, a decorative part is known in which the light element is provided on the side next to the light-conducting layer and the light is irradiated between the front and rear sides of the light-conducting layer similar to a light conductor in order to radiate the light as widely and uniformly as possible into the light-conducting layer by reflection at the surfaces. According to this proposal, a light-conducting additional layer is provided on the reverse side of the decorative layer facing away from the front visible side which should have a different refractive index than the actual light-conducting layer of which DE20 2017 105 880 U1 expects a uniformly backlit decorative layer.

However, the proposals presented above do not sufficiently satisfy the requirements placed on a backlit decorative part. A light element arranged to the side and at the height of the light-conducting layer limits the design options for the decorative part. This must have a certain lateral, non-backlit projection in which the lighting element is arranged.

SUMMARY OF THE INVENTION

This present invention intends to provide a decorative part of the type mentioned introductorily which enables uniform backlighting of the decorative layer.

In order to solve this problem, the present invention provides a decorative part with the features of one embodiment.

The decorative part according to the invention has a light conducting dome protruding from the light conducting layer on the reverse side of the light conducting layer facing away from the decorative layer. This light conducting dome is coupled with the light conducting layer in a light conducting manner. At the free end of the light conducting dome, the light element is connected to the light conducting dome in a light conducting manner. For this purpose, the light element is usually applied directly to the free end of the light conducting dome.

For this purpose, the light-conducting dome can be provided with a prismatic louvre on its free end surface so that the light emitted by the light element scatters when introduced into the light conducting dome and thus penetrates evenly into the light conducting dome.

The light-conducting dome usually has a predetermined length range corresponding to about one to six times the diameter of the light conducting dome. Over this length range, the light conducting dome is configured as a light-conducting column segment. The column segment can be slightly conical. The column segment can have a round or polygonal cross-sectional surface. Usually, the free end of the column segment is smaller in diameter than the opposite end of the column segment. At this opposite end, the column segment preferably merges into a rotationally symmetrical funnel section formed to a central longitudinal axis of the light conducting dome. This funnel section is formed as a light conductor which deflects the light beam initially emitted by the light element in a direction substantially perpendicular to the plane extension of the light conducting layer in order to introduce it flat into the light-conducting layer. The funnel section therefore has a curvature which usually favors total reflection so that the light beam is reflected by reflection within the funnel section without escaping, in order finally to introduce this light into the light-conducting layer essentially without significant losses of the amount of light emitted by the light element.

For this purpose, the funnel section is usually shaped in the manner of a half hyperboloid and preferably passes into the light-conducting layer continuously and without any set-off.

The light-conducting dome and the light-conducting layer are preferably material-identical and in particular preferably formed in one piece with each other. For example, the light-conducting layer together with the light-conducting dome can usually be manufactured as a unit from plastic, for example by injection molding. The light-conducting layer is usually provided with a structural grid on its reverse side which faces away from the decorative layer, in order to decouple the light. This structural grid usually has spherical calottes or caps which are provided on the reverse side of the light-conducting layer. These spherical caps can have a diameter of 0.8 to 1.3 mm and a height of between 0.2 and 0.4 mm.

The light-conducting layer has several light-conducting domes projecting from the reverse side of the light-conducting layer, which are provided at predetermined distances and each provided with a light element. A single light-conducting dome projects above the essentially flat light-conducting layer in the main orthogonally. If the light-conducting dome is provided at a position of the light-conducting layer at which it exhibits a curvature or a fold, the planar surfaces of the light-conducting layer extending from the light-conducting dome enclose identical angles to the central longitudinal axis of the light-conducting dome in each case. Thus, the light-conducting dome usually rises to all sides with an equal angular amount from the edge area surrounding the light-conducting dome which is formed by the light-conducting layer.

While the column segment of the light-conducting dome is completely filled with the material forming the light-conducting dome, the funnel section usually remains hollow, at least in the area of the central longitudinal axis of the light-conducting dome. The funnel section preferably has approximately the same thickness as the light-conducting layer.

For improved light distribution in the light-conducting layer, it is proposed, in accordance with a preferred further development of the present invention that the funnel section forms at least one reflector. A reflector in this sense can be any configuration that forms a reflector surface on which, in particular, the light emitted by the light element and initially transmitted through the column segment is reflected. According to this further development, the reflector serves to avoid too high a brightness of the backlit decorative layer in the area of the light-conducting dome. The reflector radiates accordingly introduced light beams at least partly back into the light-conducting dome so that these can be reflected therein again and reflected back in the direction of the light-conducting layer.

The reflector is preferably shaped as a cut in the front surface of the funnel section facing the decorative layer. Thus, the reflector can be formed in one piece and material-identical with the light-conducting dome or the light-conducting layer. The reflector can extend into areas of the flat light-conducting layer. In the area of the reflector, the thickness of the funnel section and/or the thickness of the light-conducting layer is usually reduced. The reflector usually has a reflector surface tapered towards the light-conducting layer. In a top view of the light-conducting layer, i.e. in a view along the central longitudinal axis of the light-conducting dome, said reflector surface usually has a curved shape. In a sectional view through the reflector along or parallel to the central longitudinal axis of the light-conducting dome, the reflector surface runs approximately parallel to the central longitudinal axis.

However, the concrete configuration of the reflector is at the discretion of the skilled person. The most important thing is to find a configuration, preferably by cutting in and reducing the material forming the light-conducting dome or the light-conducting layer achieving as uniform an illumination of the light-conducting layer as possible also in the area of the light-conducting dome by light reflection.

According to a preferred further development of the present invention, a shading element is provided between the light-conducting dome and the decorative layer. This shading element is usually located between the column segment and the decorative layer. In particular, the shading element can be completely surrounded by the funnel section.

Any configuration that prevents excessive illumination of the decorative layer at the level of the light-conducting dome is suitable as a shading element. Thus, a plastic insert can be provided as a shading element which is preferably rotationally symmetrical and partly shades and/or diffuses the light emitted via the light-conducting dome. The insert is usually provided with one or more openings which allow part of the light to pass through the shading element. The shading element can be mounted as an injection-molded component on the reverse side of the decorative layer and/or connected together with the light-conducting layer to the decorative layer by previous insertion into the funnel section.

The shading element can be formed from a non-translucent, highly light-absorbing plastic part. The size of the above-mentioned holes depends on the amount of light to be transmitted through the shading element.

Alternatively, the shading element can also be made of a translucent material which has a worse translucency than the material forming the light-conducting layer and/or dome. In this case, one or more bores can be dispensed with. The shading element is preferably formed by a geometrically simple body which, for example, can be rotationally symmetrical, cylindrical or the like.

Parts of the shading element can cover the previously discussed reflector and, thus, the light reflected by the shading element can refract in the area of the reflector and/or the light reflected by the reflector can be radiated through the shading element towards the decorative layer. The reinforcement layer preferably consists of a light diffusing, translucent plastic.

In the case of the decorative part according to the invention, the decorative layer can be any single or multilayer decorative layer. The decorative layer may be uniform on the visible side and contain at least one of the materials textile, wood, plastic, or metal. The decorative appearance of the decorative layer is formed in particular by these materials. This material can be provided with a transparent coating to protect the material from atmospheric influences and wear. The support serves in particular to reinforce the reverse side of the decorative layer and the light-conducting layer. It usually also serves to fasten the decorative part, for example to a chassis of the motor vehicle. For this purpose, the support can have fastening elements or pins to be protruded from the reverse side of the decorative part which are inserted into predetermined receptacles of the chassis and connected to them.

The decorative layer can be produced in any way and, if necessary, connected with its layers, for example, glued, laminated or produced by injection molding. Insert parts can be inserted into the injection-molded part or several decorative elements lying behind and/or next to each other can be formed or transformed into a uniform decorative top surface by injection pressure during the production of a reinforcing layer on the reverse side of the decorative layer.

The decorative layer of the present invention is preferably formed by injection molding or has an injection-molded reinforcing layer on its reverse side, from which usually several pins protrude on the rear side, which protrude through the light-conducting layer and the support and are caulked against the support. The support and the light-conducting layer usually have corresponding pin openings which are surrounded by contact surfaces through which the light-conducting layer abuts against the support in a predetermined position. Usually, the support forms a contact surface which is formed in the direction of the light-conducting layer and substantially surrounds the pin opening so that the light-conducting layer can also pass through in the area of the pin opening as a flat layer, whereas the support may be contoured in the area of the pin opening. The contact surface is intended to prevent deformation, in particular of the light-conducting layer, due to caulking of the pin. The cross-section of the pins is usually elongated. Accordingly, the pin openings are recessed in the manner of oblong holes in the light-conducting layer and the support.

The previously described fastening between the decorative layer and the support, preferably with an intermediate layer of a light-conducting layer, provides a completely new type of fastening which may also be essentially inventive for other decorative parts. The type of fastening is also suitable for connecting a decorative part, the light-conducting layer and the support without the need for a specific introduction of the light produced by the light element. In particular, however, a decorative layer provided with a pin, in particular an injection-molded decorative layer or a decorative layer provided on its reverse side with an injection-molded reinforcement, may also be connected directly to the support by caulking via a corresponding pin, without the need for a separate light-conducting layer.

This makes caulking suitable for all connections between a decorative layer, possibly a decorative layer coated on the visible side and/or reverse side by injection molding, and a support.

BRIEF DESCRIPTION OF THE DRAWINGS

Further details for the advantage of the present invention can be derived from the following description of an embodiment in connection with the drawing, wherein.

DETAILED DESCRIPTION OF THE INVENTION

Figure 1:
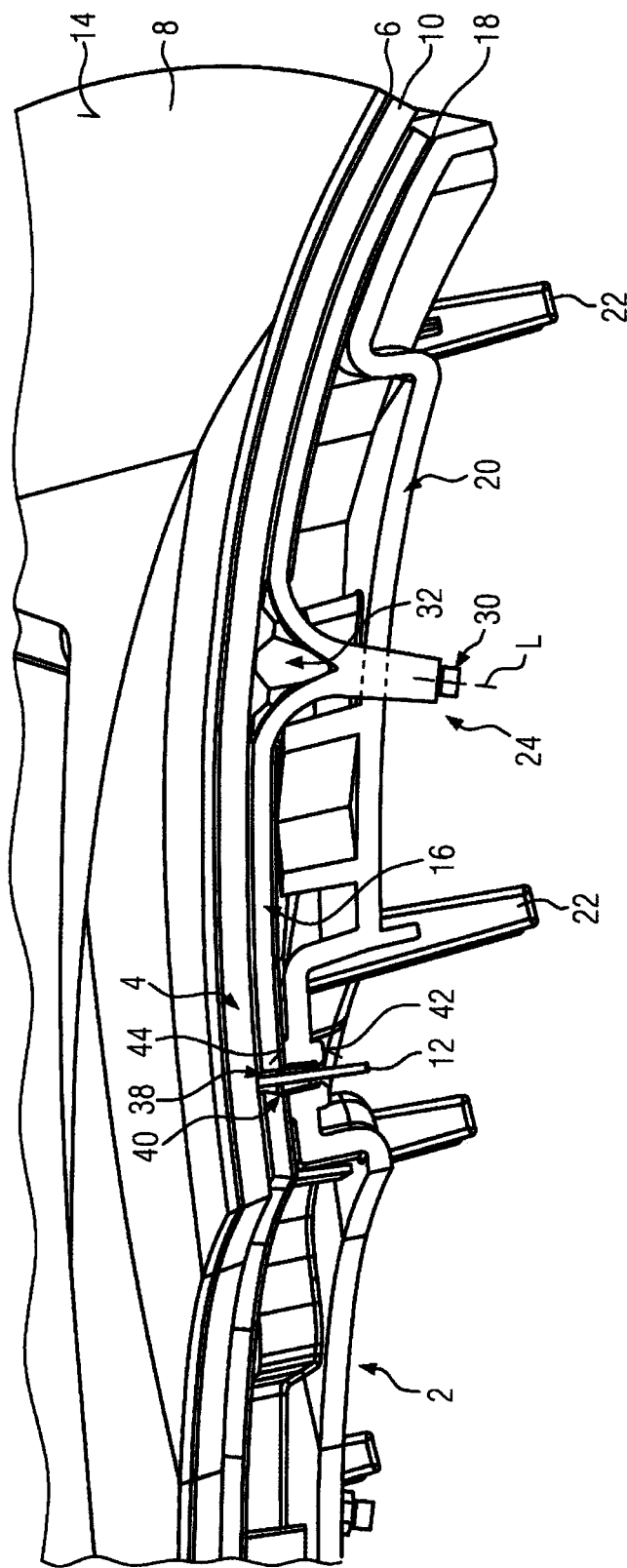
FIG. 1 shows a perspective sectional view of the embodiment.

FIG. 1 shows a decorative part 2 which is provided with a multilayer decorative layer 4. The decorative layer presently consists of a double overmolded decorative layer 6. By overmolding, a transparent coating 8 is applied to the front side of the decorative layer 6 to protect the decorative layer 6. A reinforcing layer 10 is provided by injection molding on the opposite side of the decorative layer 6. During injection molding, the reinforcing layer 10 is formed in one piece with pins 12 which will be discussed below.

The decorative layer formed in the embodiment has a front surface 14 formed by the coating 8.

A light-conducting layer 16 is arranged on the opposite side of the decorative layer 4. This light-conducting layer is provided for backlighting the decorative layer 4.

On the reverse side, the light-conducting layer 16 is provided with a reflector foil 18 forming a reflector layer.

The light-conducting layer 16 is provided between the multilayer decorative layer 4 and a support 20 also serving as a rear cover which forms the fastening pin 22 for fastening the support 20 and thus the decorative part 2 to a chassis of a motor vehicle.

As shown in FIG. 1, the support 20 is protruded by a light-conducting dome identified by reference sign 24. This light-conducting dome has a column segment 26 and a funnel section 28 and carries an LED as light element 30 at its free end. While the column segment 26 is formed of solid material and is configured as a light conductor propagating slightly conically which radiates the light produced by the light element 30 substantially at right angles to the decorative layer 4, the funnel section 28 acts as a light conductor which deflects the light from this rectangular orientation along a central longitudinal axis L of the light-conducting dome 24 so that it is radiated parallel to the plane of the light-conducting layer 16 into this layer 16.

The funnel section 28 surrounds a shading element 32 which is provided between the column segment 26 and the decorative layer 4 and is rotationally symmetrical.

Figure 2:
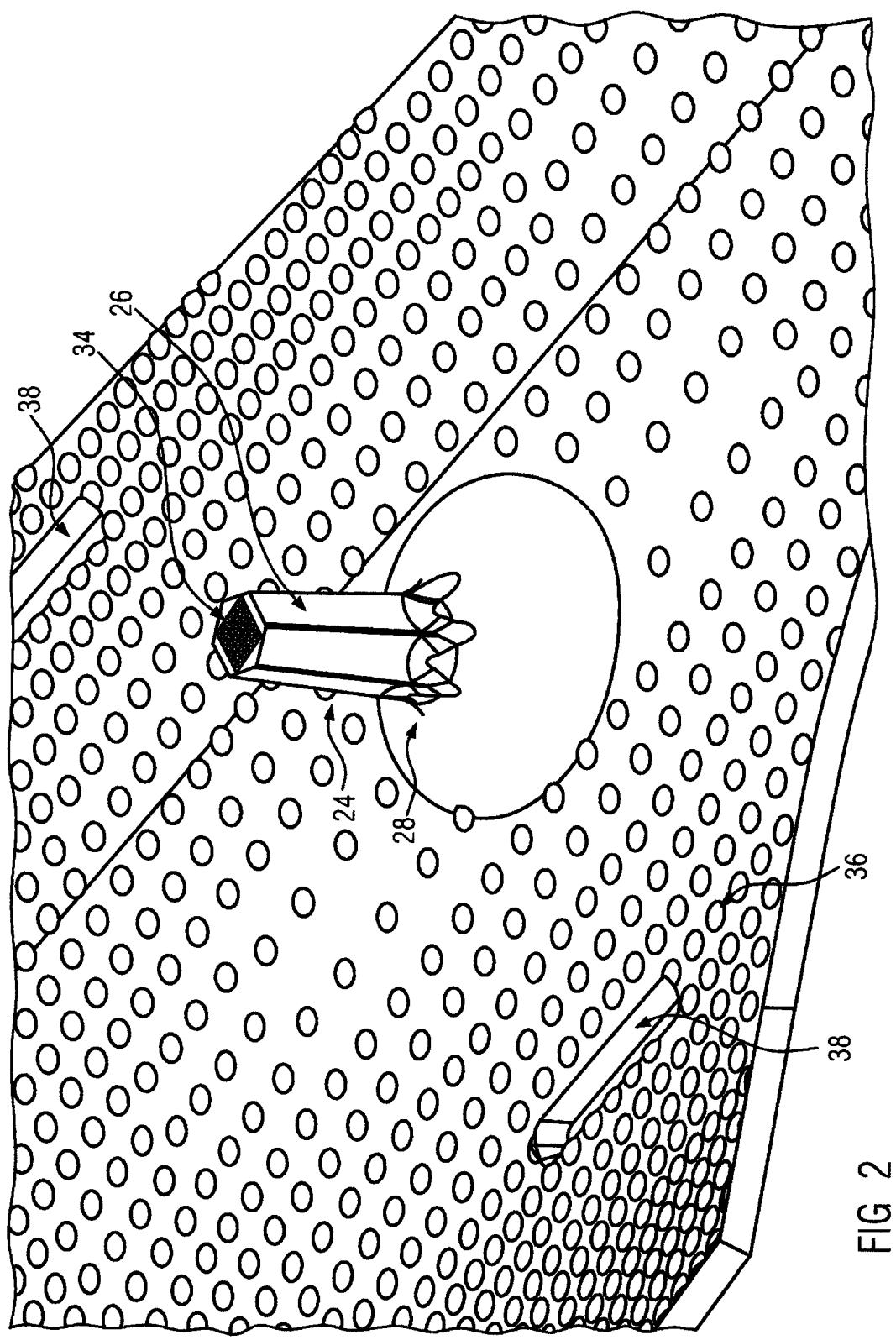
FIG. 2 shows a top view of the reverse side of the light-conducting layer of the embodiment.
Figure 3:
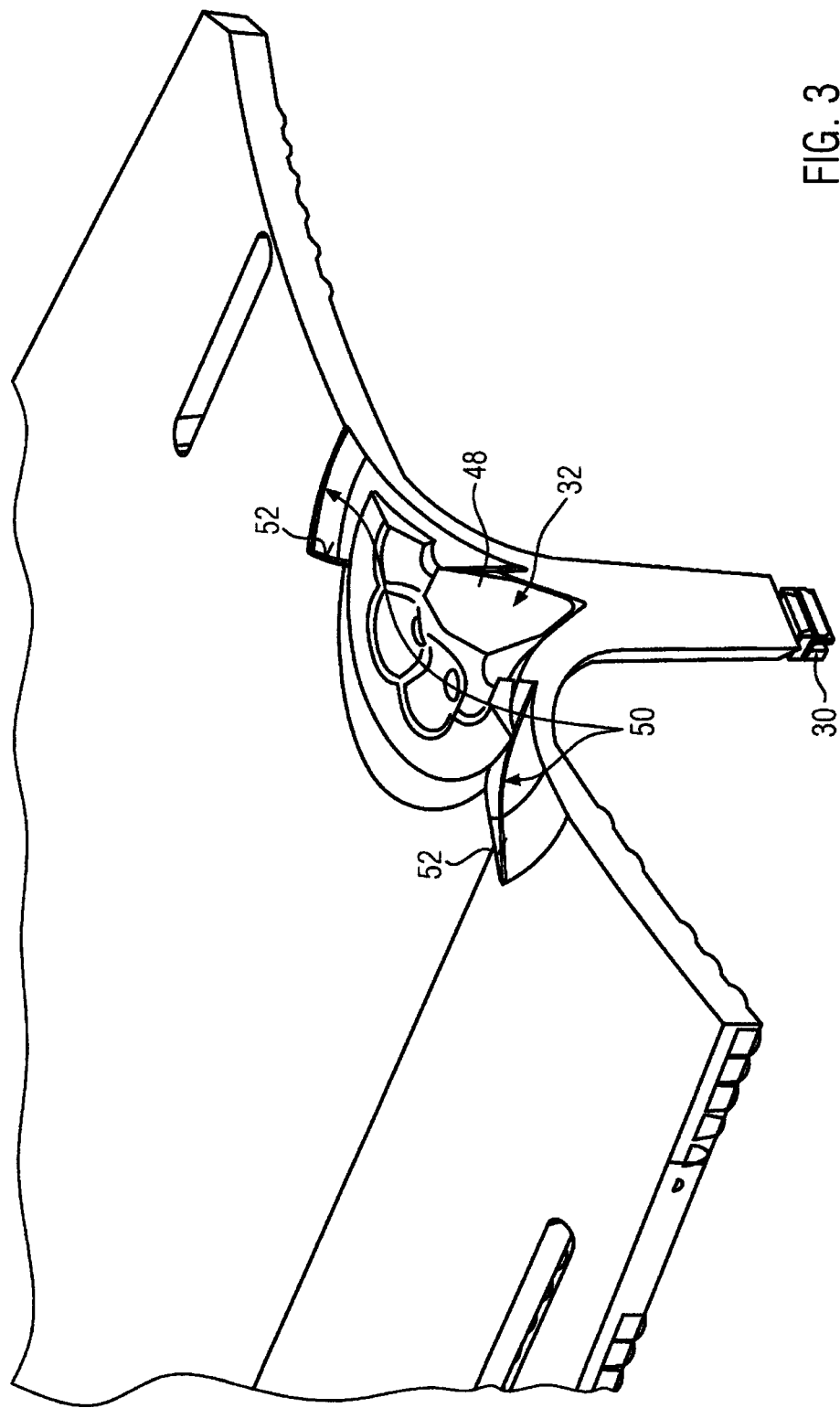
FIG. 3 shows a perspective top view of the front side of the light-conducting layer.

Details of the light-conducting dome 24 can be derived from FIGS. 2 and 3. FIG. 2 shows a prismatic louvre 34 formed at the free end of column segment 26, against which the LED 30 with its light-emitting surface is attached.

FIG. 2 further shows a structure grid 36 provided on the reverse side of the light-conducting layer 16 and comprising a plurality of spherical calottes or caps having a radius of 1 mm and a height of 0.34 mm. Said structure grid 36 serves to couple out the light for emission in the direction of the decorative layer 4. FIG. 2 further shows longitudinal slots 38 to which corresponding longitudinal slots 40 are recessed on the support 20. As shown in FIG. 1, the pin 12 protrudes through the longitudinal slots 38, 40, which are to be regarded as pin openings within the meaning of the present invention. FIG. 1 shows the pin 12 before staking. After staking, the free end of the pin 12 is plastically deformed and rests against a locking surface 42 formed on the reverse side of the longitudinal slot 40. On the opposite side, the support 20 forms a contact surface 44 against which the flat light-conducting layer 16 rests relatively over its entire surface so that the tensile force produced by the staked pin 12 does not lead to any deformation of the light-conducting layer 16 which could impair the light-conducting properties of the layer 16.

The free end area of the light-conducting dome 24, which is mainly formed by the column segment 26, is hexagonal to optimize color mixing when an RGB LED is used as the light element.

As FIG. 3 illustrates, the shading element 32 presently is shaped as an injection-molded funnel comprising a large number of bores 46 distributed around the circumference, each of which also runs out in the shape of a funnel towards the decorative layer 4. The bores 46 serve as apertures which partly absorb the light emitted by the light-conducting dome 24 in the direction of the decorative layer 4 and partly allow it to pass through and thereby scatter it so that it emerges scattered on the front surface of the shading element 32 facing the decorative layer 4. The shading element 32 has a conical projection 48 which is positively coupled with the tapered end area of the funnel section 28 and positioned centrally to the central longitudinal axis L.

Figure 4:
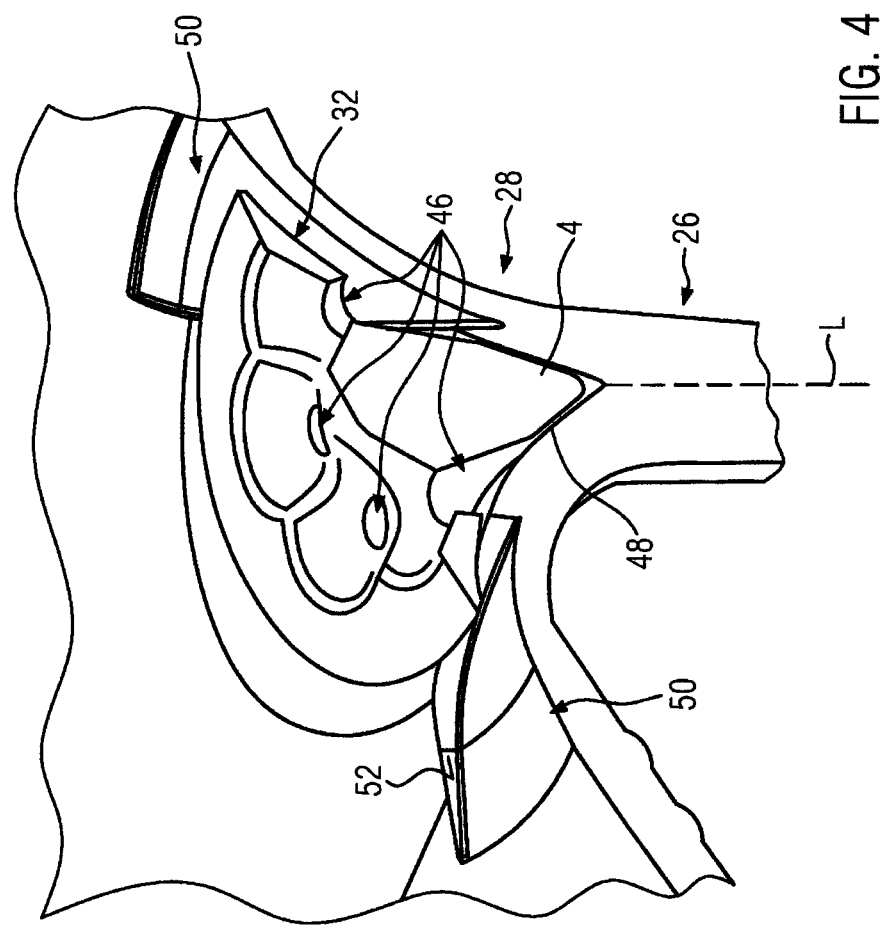
FIG. 4 shows an enlarged detail of the view as shown in FIG. 3.

As FIG. 4 illustrates, the shading element 32 extends radially over a reflector identified by reference sign 50 which has a crescent-shaped course in the top view and is thus provided partly below the shading element 32 and partly radially outside the same and the reflector surface 52 of which extends substantially parallel to the center longitudinal axis L.

The production of the embodiment shown in the Figures is as follows: First, the decorative layer 6 is back-injected with the reinforcing layer 10 and then overmolded with the coating 8 on the visible side in order to obtain the decorative layer 4 together with the pins 12. For example, the light-conducting layer 16 is formed in parallel as a uniform component together with the light-conducting dome 24 by injection molding. It goes without saying that several light-conducting domes 24 can be provided depending on the size of the light-conducting layer 16. Then, while recessing a substantial part of the light-conducting dome 24, the reflector foil 18 is attached to the reverse side of the light-conducting layer 16 and connected to it, in particular glued. These components are joined with the support 20 produced separately by injection molding by arranging the two longitudinal slots 38, 40 in alignment with each other and penetrating them with the pin 12. The latter is melted onto its end projecting beyond the support 20, resulting in a thickened area which rests against the locking surface 42. Usually, the LED is then glued on and wired to the power supply. This wiring can be done via a printed circuit board which electrically connects several LEDs or light elements 30 and can be provided on the reverse side of the support 20 and/or can rest on the reverse side of the support 20.

Figure 5:
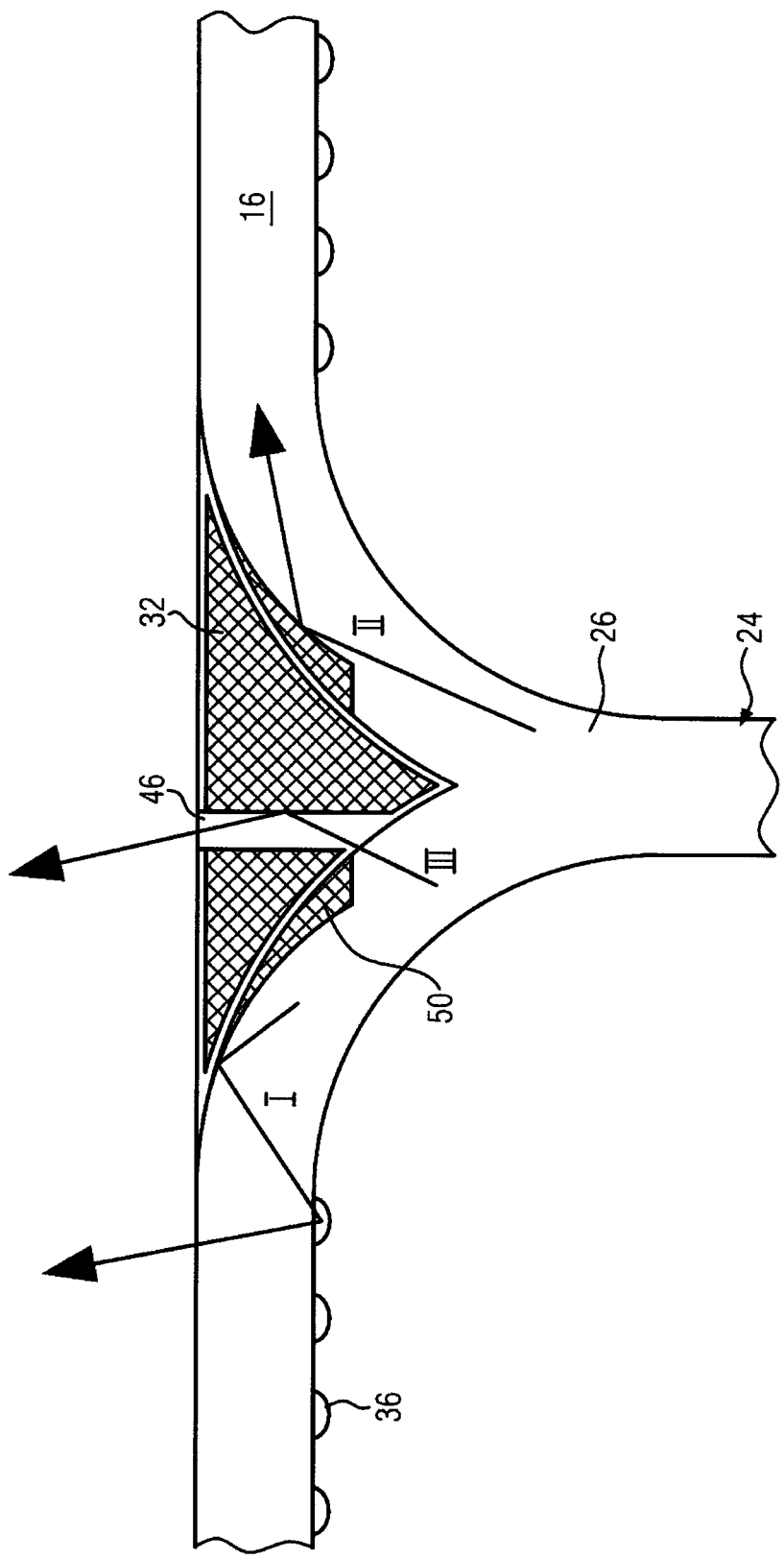
FIG. 5 shows a longitudinal sectional view through a light-conducting dome of the embodiment with some beam paths.

FIG. 5 shows a sectional view of a light-conducting dome 24 with beam paths. Light beams guided via the column segment 26 reach the reflector 50, for example, and are reflected at its surface. The beam path or light beam identified with reference sign I strikes the reflector 50 at a relatively pointed angle and is reflected directly adjacent to the funnel section by a segment of the structural grid 36 and emitted through the front side of the light-conducting layer 16.

The light beam identified by the reference sign II hits the surface of the reflector 50 at a relatively obtuse angle and is transmitted through it essentially parallel to the light-conducting layer 16.

The light beam identified with reference sign III passes through the bore 46 and is reflected inside the bore and radiated in the direction of the decorative layer 6.

These and other reflection effects result in uniform backlighting of the decorative layer 6.

REFERENCE SIGN LIST 2 decorative part
4 decorative layer
6 decorative layer
8 coating
10 reinforcing layer
12 pin
14 front surface
16 light-conducting layer
18 reflector foil
20 support
22 fastening pin
24 light-conducting dome
26 column segment
28 funnel section
30 light element/LED
32 shading element
34 prismatic louvre
36 structural grid
38 longitudinal slot
40 longitudinal slot
42 locking surface
44 contact surface
46 bore
48 conical projection
50 reflector
52 reflector surface
54 central longitudinal axis of the light-conducting dome

What is claimed is:

1. A decorative part with backlighting for a vehicle interior, comprising:
    a decorative layer with a visible front surface;
    a light-conducting layer having a first translucency entirely provided on a reverse side of the decorative layer for backlighting the decorative layer uniformly;
    a support sandwiching the light-conducting layer between the decorative layer and the support;
    a light generating element that is coupled in a light conducting manner to a free end of a light-conducting dome which protrudes from the reverse side of the light-conducting layer and which is coupled in a light conducting manner to the light-conducting layer; and
    a shading element placed between the light-conducting dome and the decorative layer, the shading element being rotationally symmetrical and having a second translucency worse than the first translucency of the light-conducting layer,
    whereby the light generating element provides uniform backlighting to the decorative layer through the light-conducting layer and the shading element.

2. A decorative part according to claim 1, wherein:
    the light-conducting dome and the light-conducting layer are configured identically to the material and/or in one piece.

3. A decorative part according to claim 1, wherein:
    the light-conducting dome has a funnel section formed rotationally symmetrically with respect to its central longitudinal axis.

4. A decorative part according to claim 3, wherein:
    the funnel portion is configured as a light conductor leading to the light-conducting layer.

5. A decorative part according to claim 3, wherein:
    the funnel section forms at least one reflector.

6. A decorative part according to claim 5, wherein:
    the reflector comprises at least one reflector surface which reflects the light radiated by the light-conducting dome.

7. A decorative part according to claim 1, wherein:
    the shading element is configured as an independent element.

8. A decorative part according to claim 1, wherein:
    the light-conducting dome projects through the support.

9. A decorative part according to claim 8, wherein:
    the light-conducting dome projects through a reflector foil provided on the reverse side of the light-conducting layer.

10. A decorative part according to claim 1, wherein:
    the light-conducting dome projects through a reflector foil provided on the reverse side of the light-conducting layer.

11. A decorative part according to claim 1, wherein:
    the shading element has a different translucency than the light-conducting dome.

12. A decorative part according to claim 1, wherein:
    the decorative layer has a decorative appearance provided by a single or multilayer decorative layer formed of at least one of the materials textile, wood, plastic, or metal.

13. A decorative part according to claim 1, wherein:
    the support comprises at least one fastening element protruding from a reverse side of the decorative part for fastening the decorative part to a chassis of a vehicle.

14. A decorative part according to claim 1, further comprising:
    a plurality of bores distributed circumferentially around said shade element, each of the plurality of bores ending in a funnel shape towards said decorative layer.

15. A decorative part for providing uniform backlighting comprising:
    a decorative layer having a viewable front side and a backside;
    a light-conducting layer placed adjacent the backside of said decorative layer without extending through said decorative layer, whereby said light-conducting layer is capable of uniformly backlighting the viewable front side of said decorative layer;
    a light-conducting dome formed in said light-conducting layer, said light-conducting dome having a column segment with a distal end and a funnel section;
    a shading element placed in said funnel section, said shading element having a worse translucency than said light conducting dome and a plurality of bores distributed circumferentially around said shade element, each of the plurality of bores ending in a funnel shape towards said decorative layer configured to scatter light on a front surface of said shading element and a plurality of reflectors configured to reflect light from the column segment along said light-conducting layer; and a light element placed on the distal end of the column segment, whereby light from said light element can travel through the column segment and the funnel section to the light-conducting layer uniformly backlighting said decorative layer.

16. A decorative part for providing uniform backlighting as in claim 15 wherein:

said decorative layer is selected from the group consisting of textile, wood, plastic, and metal.

17. A decorative part for providing uniform backlighting as in claim 15 further comprising:

a rear cover attached to the decorative part; and a fastening pin attached to said rear cover, whereby the rear cover is capable of being attached to a chassis of a motor vehicle.

\* \* \* \* \*